US012706009B2

(12) United States Patent
Han et al.

(10) Patent No.: US 12,706,009 B2
(45) Date of Patent: Aug. 11, 2026

(54) LIGHT EMITTING DISPLAY APPARATUS

(71) Applicant: LG Display Co., Ltd., Seoul (KR)

(72) Inventors: Junhee Han, Paju-si (KR); Yoonseob Jeong, Paju-si (KR)

(73) Assignee: LG Display Co., Ltd., Seoul (KR)

(*) Notice: Subject to any disclaimer, the term of this patent is extended or adjusted under 35 U.S.C. 154(b) by 136 days.

(21) Appl. No.: 18/670,558

(22) Filed: May 21, 2024

(65) Prior Publication Data

US 2025/0078703 A1 Mar. 6, 2025

(30) Foreign Application Priority Data

Aug. 30, 2023 (KR) ........................ 10-2023-0114342

(51) Int. Cl.

*G09G 3/00* (2006.01)
*G09G 3/32* (2016.01)

(52) U.S. Cl.

CPC ............... *G09G 3/006* (2013.01); *G09G 3/32* (2013.01); *G09G 2330/10* (2013.01); *G09G 2330/12* (2013.01)

(58) Field of Classification Search

CPC ...... G09G 3/006; G09G 3/32; G09G 2330/10; G09G 2330/12; G09G 3/3208; G09G 2300/0426; G09G 2330/08; H10K 59/12; H10K 71/70; H10K 59/123; H10K 59/131; H10K 59/805; H01L 22/34; H01L 23/544

See application file for complete search history.

(56) References Cited

U.S. PATENT DOCUMENTS 11,730,046 B2 8/2023 Kim et al.
2011/0043499 A1* 2/2011 Cok ....................... H10K 71/70 345/82
2014/0354700 A1* 12/2014 Hong ................... G09G 3/3233 345/82
2015/0123884 A1* 5/2015 Kim ..................... G09G 3/3208 345/82
2021/0143373 A1 5/2021 Kim et al.
2022/0139300 A1* 5/2022 Yokoyama ............. H05B 33/14 345/214
2023/0337511 A1 10/2023 Kim et al.
2024/0196664 A1* 6/2024 Kim ..................... H10K 59/123

FOREIGN PATENT DOCUMENTS

KR 10-2021-0057522 A 5/2021

* cited by examiner

*Primary Examiner* — Bryan Earles
(74) *Attorney, Agent, or Firm* — Fenwick & West LLP

(57) ABSTRACT

A light emitting display apparatus is disclosed in which a test light emitting device capable of providing information on the cause of pixel defect is provided in a transmission unit. The light emitting display apparatus comprises a substrate including a light emitting area where an image is displayed and a transmission area through which light transmits, a pixel provided in the light emitting area, and a test light emitting device connected to a light emitting device provided in the pixel and provided in the transmission area.

26 Claims, 10 Drawing Sheets

LIGHT EMITTING DISPLAY APPARATUS

CROSS-REFERENCE TO RELATED APPLICATION

This application claims the benefit of the Republic of Korea Patent Application No. 10-2023-0114342 filed on Aug. 30, 2023, which is hereby incorporated by reference in its entirety.

BACKGROUND

Field of Technology

The present disclosure relates to a light emitting display apparatus.

Discussion of the Related Art

Light emitting display apparatuses are mounted on or provided in electronic products such as televisions, monitors, notebook computers, smart phones, tablet computers, electronic pads, wearable devices, watch phones, portable information devices, navigation devices, or vehicle control display devices, etc., to display images.

A light emitting display panel applied to a light emitting display apparatus can include a transmission area through which external light transmits. The transmission area can account for a large portion of the overall area of the light emitting display panel.

Therefore, among the pixels provided in the light emitting display panel, a defective pixel which does not output light is more visible to the user's eyes in a light emitting display panel including the transmission area than in a light emitting display panel which does not include a transmission area. Further, it is difficult to clearly determine the cause of defective pixel.

Therefore, it is difficult to perform a repair process for defective pixels, and accordingly, the defect rate of a light emitting display panel including the transmission area can be greater than the defect rate of a light emitting display panel that lacks the transmission area.

The above-described background is part of the present disclosure to devise the present disclosure or is technical information acquired by a process of devising the present disclosure, but may not be regarded as the known art disclosed to the general public before the present disclosure is disclosed.

SUMMARY

Accordingly, the present disclosure is directed to providing a light emitting display apparatus that substantially obviates one or more problems due to limitations and disadvantages of the related art.

An embodiment of the present disclosure is directed to providing a light emitting display apparatus in which a test light emitting device capable of providing information on the cause of pixel defect is provided in a transmission unit.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a light emitting display apparatus comprising: a substrate including a light emitting area where an image is displayed and a transmission area through which external light transmits; a pixel in the light emitting area, the pixel comprising a light emitting device; and a test light emitting device in the transmission area, the test light emitting device connected to the light emitting device included in the pixel.

In one embodiment, a light emitting display apparatus comprises: a substrate including a light emitting area configured to display an image and a transmission area that is more transmissive of external light than the light emitting area; a light emitting device in the light emitting area, the light emitting device including an anode electrode, a light emitting layer on the anode electrode, and a cathode electrode on the light emitting layer; a test light emitting device in the transmission area, the test light emitting device including a test anode electrode that is electrically connected to the anode electrode of the light emitting device, a test light emitting layer on the test anode electrode, and a test cathode electrode on the test light emitting layer; and a boundary hole around the test light emitting device, the boundary hole disconnecting the cathode electrode of the light emitting device and the test cathode electrode from each other.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
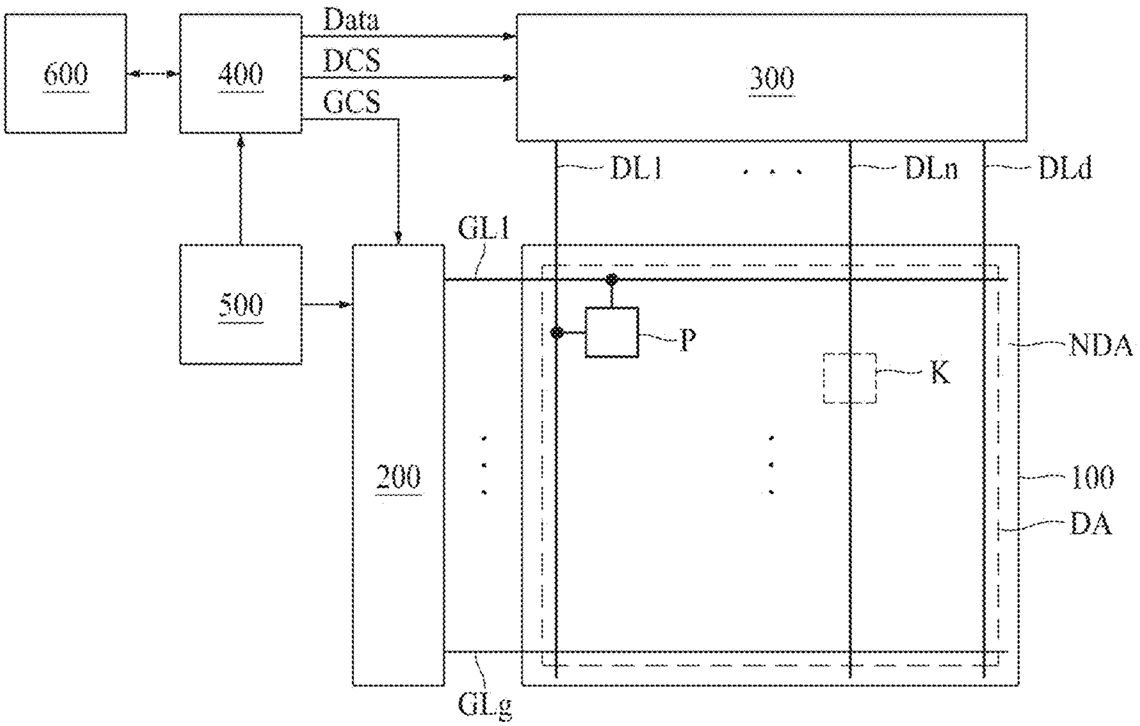
FIG. 1 is an exemplary diagram illustrating a configuration of a light emitting display apparatus according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings.

Figure 2:
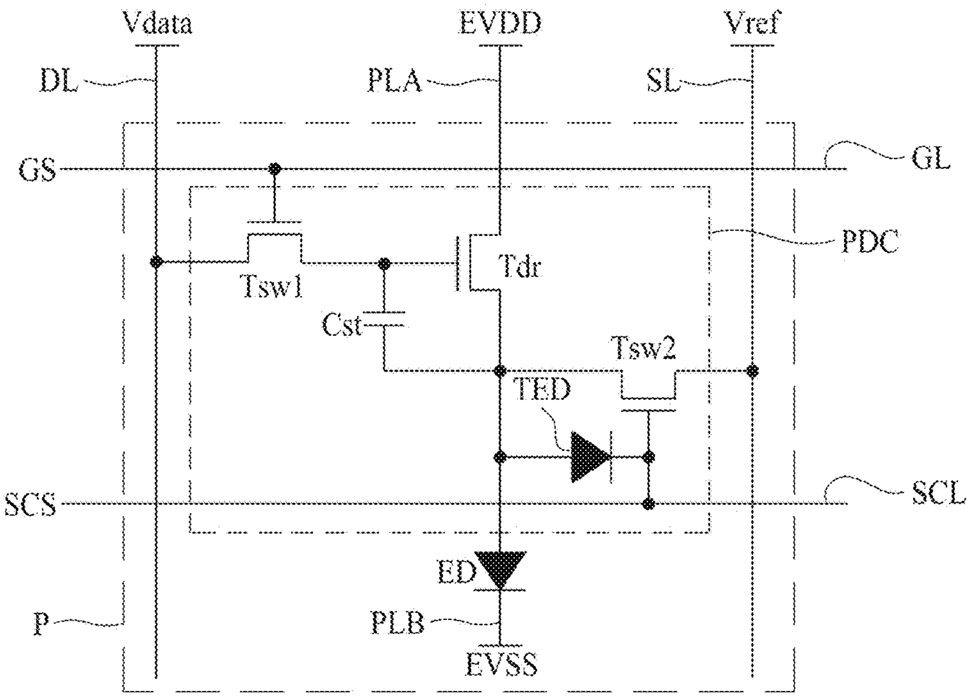
FIG. 2 is an exemplary diagram illustrating a structure of a pixel applied to a light emitting display apparatus according to an embodiment of the present disclosure.
Figure 3:
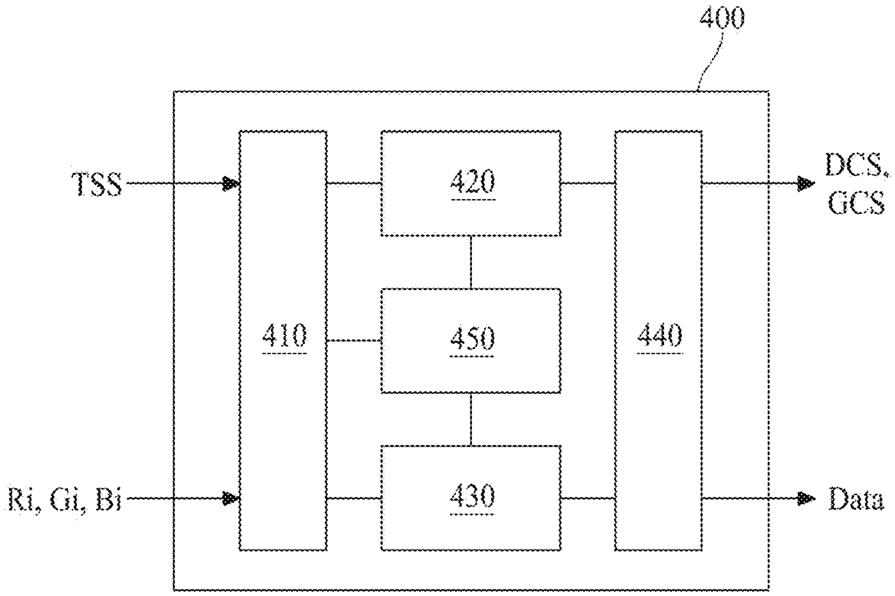
FIG. 3 is an exemplary diagram illustrating a structure of a control driver applied to a light emitting display apparatus according to an embodiment of the present disclosure.
Figure 4:
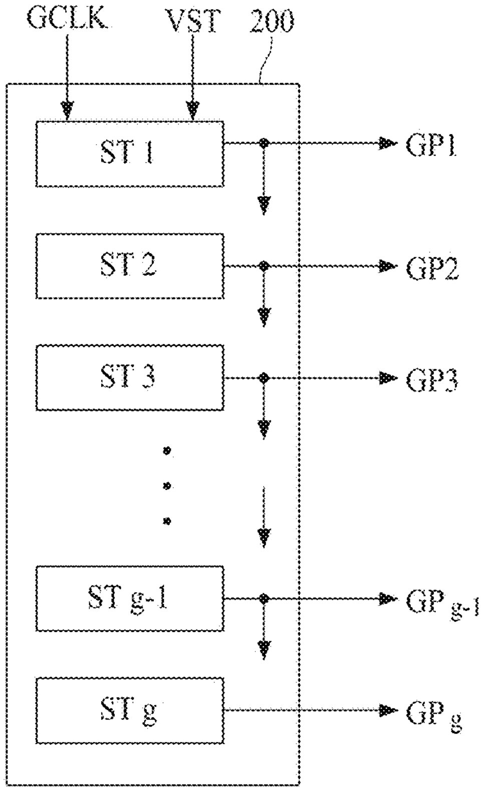
FIG. 4 is an exemplary diagram illustrating a structure of a gate driver applied to a light emitting display apparatus according to an embodiment of the present disclosure.
Figure 5:
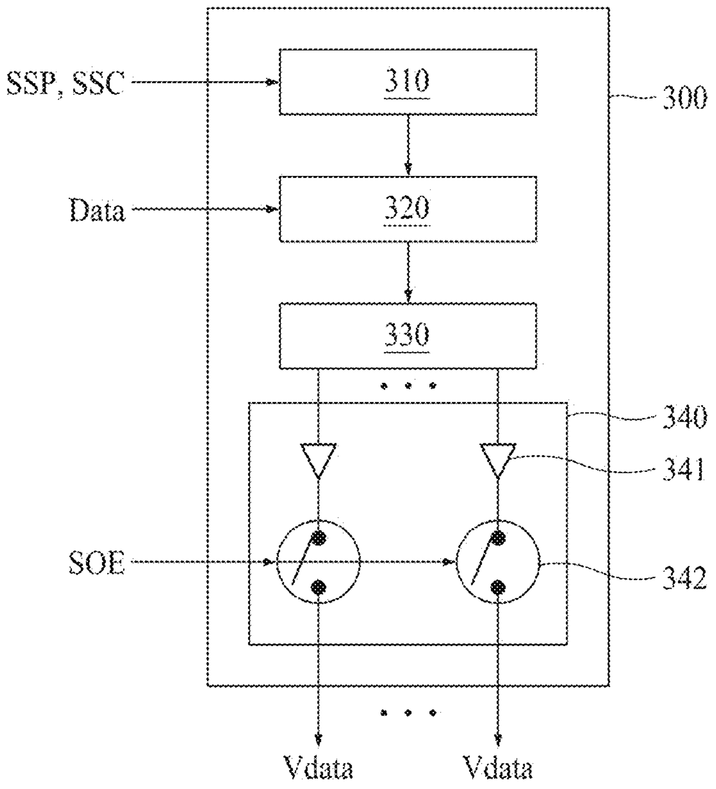
FIG. 5 is an exemplary diagram illustrating a structure of a data driver applied to a light emitting display apparatus according to an embodiment of the present disclosure.

FIG. 1 is an exemplary diagram illustrating a configuration of a light emitting display apparatus according to an embodiment of the present disclosure, FIG. 2 is an exemplary diagram illustrating a structure of a pixel applied to a light emitting display apparatus according to an embodiment of the present disclosure, FIG. 3 is an exemplary diagram illustrating a structure of a control driver applied to a light emitting display apparatus according to an embodiment of the present disclosure, FIG. 4 is an exemplary diagram illustrating a structure of a gate driver applied to a light emitting display apparatus according to an embodiment of the present disclosure, and FIG. 5 is an exemplary diagram illustrating a structure of a data driver applied to a light emitting display apparatus according to an embodiment of the present disclosure.

A light emitting display apparatus according to an embodiment of the present disclosure can be used as various kinds of electronic devices. Electronic devices can be, for example, televisions, monitors, etc.

The light emitting display apparatus according to an embodiment of the present disclosure, as illustrated in FIG. 1, can include a light emitting display panel 100 which includes a display area DA displaying an image and a non-display area NDA provided outside the display area DA, a gate driver 200 which supplies gate signals GS to a plurality of gate lines GL1 to GLg provided in the display area DA of the display panel 100, a data driver 300 which supplies data voltages Vdata to a plurality of data lines DL1 to DLd provided in the display area DA of the display panel 100, a control driver 400 which controls driving of the gate driver 200 and the data driver 300, and a power supply 500 which supplies power to the control driver 400, the gate driver 200, the data driver 300, and the light emitting display panel 100.

The light emitting display panel 100 can include a display area DA and a non-display area NDA. Gate lines GL1 to GLg, data lines DL1 to DLd, and pixels P can be provided in the display area DA. Accordingly, an image can be output in the display area DA. Here, g and d are natural numbers. The non-display area NDA can surround the outer periphery of the display area DA.

The pixel P included in the light emitting display panel 100, as illustrated in FIG. 2, can include a pixel driving circuit PDC which includes a switching transistor Tsw1, a storage capacitor Cst, a driving transistor Tdr, and a sensing transistor Tsw2, and a light emitting device ED connected to the pixel driving circuit PDC.

A first terminal of the driving transistor Tdr can be connected to a first voltage supply line through which a first voltage EVDD is supplied, and a second terminal of the driving transistor Tdr can be connected to the light emitting device ED.

A first terminal of the switching transistor Tsw1 can be connected to a data line DL, a second terminal of the switching transistor Tsw1 can be connected to a gate of the driving transistor Tdr, and a gate of the switching transistor Tsw1 can be connected to a gate line GL.

A data voltage Vdata can be supplied through the data line DL from the data driver 300. A gate signal GS can be supplied through the gate line GL from the gate driver 200. The gate signal GS can include a gate pulse GP for turning on the switching transistor Tsw1 and a gate-off signal for turning off the switching transistor Tsw1.

The sensing transistor Tsw2 can be provided for measuring a threshold voltage of the driving transistor Tdr or mobility, or supplying a reference voltage Vref to the pixel driving circuit PDC. A first terminal of the sensing transistor Tsw2 can be connected to the second terminal of the driving transistor Tdr and the light emitting device ED, a second terminal of the sensing transistor Tsw2 can be connected to a sensing line SL through which the reference voltage Vref is supplied, and a gate of the sensing transistor Tsw2 can be connected to a sensing control line SCL through which a sensing control signal SCS is supplied.

The sensing line SL can be connected to the data driver 300 and can be connected to the power supply 500 through the data driver 300. For example, the reference voltage Vref supplied from the power supply 500 can be supplied to the pixels through the sensing line SL, sensing signals transmitted from the pixels P can be converted into digital sensing signals in the data driver 300, and the digital sensing signals can be transmitted to the control driver 400.

The light emitting device ED can include a first electrode supplied with a first voltage EVDD through the driving transistor Tdr, a second electrode connected to a second voltage supply line PLB through which a second voltage is supplied, and a light emitting layer provided between the first electrode and the second electrode.

As illustrated in FIG. 2, a pixel P applied to the present disclosure can also include a test light emitting device TED provided between the anode of the light emitting device ED and the gate of the switching transistor Tsw2.

The structure and function of the test light emitting device TED will be described in detail below with reference to FIGS. 6 to 15.

The structure of the pixel P applied to the present disclosure is not limited to the structure illustrated in FIG. 2. Accordingly, the structure of the pixel P can be changed to various shapes.

The control driver 400 can realign input image data Ri, Gi, and Bi transmitted from an external system 600 by using a timing synchronization signal TSS transmitted from the external system and can generate a data control signal DCS which is to be supplied to the data driver 300 and a gate control signal GCS which is to be supplied to the gate driver 200.

To this end, as illustrated in FIG. 3, the control driver 400 can include a data aligner 430 (e.g., a circuit) which realigns input image data Ri, Gi, and Bi to generate image data Data and transmits the image data Data to the data driver 300, a control signal generator 420 which generates the gate control signal GCS and the data control signal DCS by using the timing synchronization signal TSS, an input unit 410 (e.g., a circuit) which transmits the timing synchronization signal TSS transmitted from the external system 600 to the control signal generator 420 (e.g., a circuit) and transmits the input image data Ri, Gi, and Bi transmitted from the external system 600 to the data aligner 430, and an output unit 440 (e.g., a circuit) which supplies the data driver 300 with the image data Data generated by the data aligner 430 and the data control signal DCS generated by the control signal generator 420 and supplies the gate driver 200 with the gate control signal GCS generated by the control signal generator 420.

The control signal generator 420 can generate a power control signal supplied to the power supply 500.

The control driver 400 can further include a storage unit for storing various information. The storage unit 450 (e.g., memory) can be included in the control driver 400 as illustrated in FIG. 3, but can be separated from the control driver 400 and provided independently.

The external system 600 can perform a function of driving the control driver 400 and an electronic device.

For example, when the electronic device is a television (TV), the external system 600 can receive various kinds of sound information, image information, and letter information over a communication network and can transmit the received image information to the control driver 400. For example, the external system 600 can convert the image information into input image data Ri, Gi, and Bi and transmit the input image data Ri, Gi, and Bi to the control driver 400.

The power supply 500 can generate various powers and supply the generated powers to the control driver 400, the gate driver 200, the data driver 300, and the light emitting display panel 100.

The gate driver 200 can be directly embedded into the non-display area NDA by using a gate-in panel (GIP) type, or the gate driver 200 can be provided in the display area DA in which light emitting devices ED are provided, or can be provided on a chip on film mounted in the non-display area NDA.

The gate driver 200 can supply gate pulses GP1 to GPg to the gate lines GL1 to GLg.

When a gate pulse GP generated by the gate driver 200 is supplied to a gate of the switching transistor Tsw1 included in the pixel P, the switching transistor Tsw1 can be turned on. When the switching transistor Tsw1 is turned on, data voltage Vdata supplied through a data line DL can be supplied to the pixel P.

When a gate-off signal generated by the gate driver 200 is supplied to the switching transistor Tsw1, the switching transistor Tsw1 can be turned off. When the switching transistor Tsw1 is turned off, a data voltage may not be supplied to the pixel P any longer.

The gate signal GS supplied to the gate line GL can include the gate pulse GP and the gate-off signal.

To supply gate pulses GP1 to GPg to gate lines GL1 to GLg, the gate driver 200, as illustrated in FIG. 4, can include stages ST1 to STg connected to gate lines GL1 to GLg.

Each of the stages ST1 to STg can be connected to one gate line GL, but can be connected to at least two gate lines GL.

In order to generate gate pulses GP1 to GPg, a gate start signal VST and at least one gate clock GCLK which are generated by the control signal generator 420 can be transferred to the gate driver 200. For example, the gate start signal VST and the at least one gate clock GCLK can be included in the gate control signal GCS.

One of the stages ST1 to STg can be driven by a gate start signal VST to output a gate pulse GP to a gate line GL. The gate pulse GP can be generated by a gate clock GCLK.

At least one of signals output from a stage ST where a gate pulse is output can be supplied to another stage ST to drive another stage ST. Accordingly, a gate pulse can be output in another stage ST.

For example, the stages ST can be driven sequentially to sequentially supply the gate pulses GP to the gate lines GL.

The data driver 300 can supply data voltages Vdata to the data lines DL1 to DLd.

To this end, the data driver 300, as illustrated in FIG. 5, can include a shift register 310 which outputs a sampling signal, a latch 320 which latches image data Data received from the control driver 400, a digital-to-analog converter 330 which converts the image data Data, transmitted from the latch 320, into a data voltage Vdata and outputs the data voltage Vdata, and an output buffer 340 which outputs the data voltage, transmitted from the digital-to-analog converter 330, to the data line DL on the basis of a source output enable signal SOE.

The shift register 310 can output the sampling signal by using the data control signal DCS received from the control signal generator 420. For example, the data control signals DCS transmitted to the shift register 310 can include a source start pulse SSP and a source shift clock signal SSC.

The latch 320 can latch image data Data sequentially received from the control driver 400, and then output the image data Data to the digital-to-analog converter 330 at the same time on the basis of the sampling signal.

The digital-to-analog converter 330 can convert the image data Data transmitted from the latch 320 into data voltages Vdata and output the data voltages Vdata.

The output buffer 340 can simultaneously output the data voltages Vdata transmitted from the digital-to-analog converter 330 to data lines DL1 to DLd of the light emitting display panel 100 on the basis of the source output enable signal SOE transmitted from the control signal generator 420.

To this end, the output buffer 340 can include a buffer 341 which stores the data voltage Vdata transmitted from the digital-to-analog converter 330 and a switch 342 which outputs the data voltage Vdata stored in the buffer 341 to the data line DL on the basis of the source output enable signal SOE.

For example, when the switches 342 are turned on based on the source output enable signal SOE simultaneously supplied to the switches 342, the data voltages Vdata stored in the buffers 341 can be supplied to the data lines DL1 to DLd through the switches 342.

The data voltages Vdata supplied to the data lines DL1 to DLd can be supplied to pixels P connected to a gate line GL supplied with a gate pulse GP.

Figure 6:
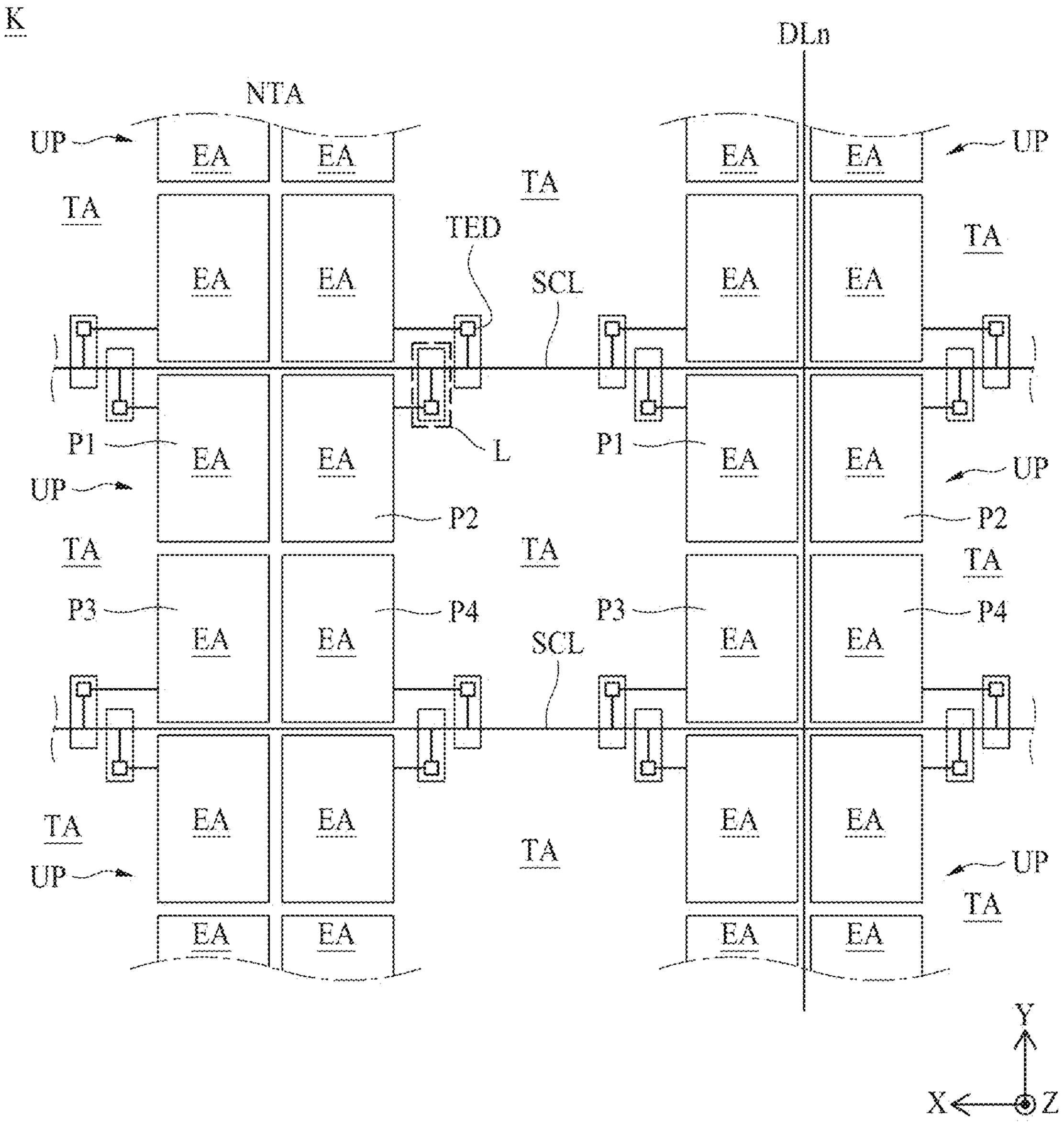
FIG. 6 is a plan view illustrating pixels arranged in an area K of FIG. 1 according to an embodiment of the present disclosure.

FIG. 6 is a plan view illustrating pixels arranged in an area K of FIG. 1 according to an embodiment of the present disclosure. In the following description, details which are the same as or similar to details described with reference to FIGS. 1 to 5 are omitted or will be briefly described.

A light emitting display panel applied to a light emitting display apparatus according to an embodiment of the present disclosure can include a transmission area TA and a non-transmission area NTA.

For example, the display area DA of the light emitting display panel 100 can include the transmission are TA (or referred to as a transparent area) and the non-transmission area NTA.

The transmission area TA can be an area which allows most of external light incident from the outside to pass through. The non-transmission area NTA can be an area which does not transmit most of light incident from the outside. Moreover, the non-transmission area NTA can mean an area where pixels P are provided. Thus, the non-transmission area NTA is less transmissive of external light than the transmission area TA.

Due to the transmission area TA, an object or background located on the rear side of a light emitting display panel 100 can be visible from the front of the light emitting display panel 100.

The non-transmission area NTA can be disposed between adjacent transmission areas TA, and pixels P and signal lines can be disposed in the non-transmission area NTA.

Particularly, the non-transmission area NTA can include a light emitting area EA in which light is emitted and a non-light emitting area NEA in which light is not emitted.

Light can be emitted by a light emitting device ED in the light emitting area EA of the non-transmission area NTA, and a pixel driving circuit PDC configuring a pixel P and signal lines connected to the pixel can be provided in the non-light emitting area of the non-transmission area NTA.

In the following description, the light emitting area EA may mean a pixel P, a light emitting device ED outputting light, an anode configuring the light emitting device ED, or an area where light is actually output.

A bank surrounding the light emitting area EA can be provided in the non-light emitting area.

The signal lines can include first signal lines extending in a first direction (or Y-axis direction) in the non-transmission area NTA and second signal lines extending in a second direction (or X-axis direction) different from the first direction. For example, the first signal lines can include data lines DL and sensing lines SL, and the second signal lines can include gate lines GL and the sensing control lines SCL.

Unit pixel UP including at least three pixels P can be provided in the non-transmission area NTA. White light can be emitted through the unit pixel UP. Hereinafter, for convenience of description, a light emitting display apparatus according to an embodiment of the present disclosure will be described using a unit pixel UP including four pixels P1, P2, P3, and P4 as an example.

For example, the unit pixel UP can include a first pixel P1, a second pixel P2, a third pixel P3, and a fourth pixel P4.

The first pixel P1 can include a first light emitting area EA which emits light of a first color, the second pixel P2 can include a second light emitting area EA which emits light of a second color, the third pixel P3 can include a third light emitting area EA which emits light of a third color, and the fourth pixel P4 can include a fourth light emitting area EA which emits light of a fourth color.

For example, the first light emitting area EA can emit blue light, the second light emitting area EA can emit red light, the third light emitting area EA can emit green light, and the fourth light emitting area EA can emit white light.

However, in addition to the combination of pixels emitting the colors described above, the unit pixel UP can also be configured to include a combination of pixels emitting other colors. For example, the four pixels P1, P2, P3, and P4 can emit blue light, red light, green light, and white light as described above, but the present disclosure is not limited thereto. Accordingly, the four pixels P1, P2, P3, and P4 can emit another combination of color lights.

The transmission area TA can be disposed between adjacent non-transmission areas NTA, and light emitting devices ED and pixel driving circuits PDC configuring the pixels P1, P2, P3, and P4 may not be provided in the transmission area TA.

For example, non-transmission element or opaque element may not be disposed in the transmission area TA, and thus, the transmission area TA can be an area with a high light transmittance.

For example, the transmission area TA may not overlap the pixel driving circuits PDC configuring the pixels P1, P2, P3, and P4. Moreover, the transmission area TA may not overlap light emitting devices configuring the pixels P1, P2, P3, and P4.

For example, the transmission area TA can be arranged along the first direction (or Y-axis direction) as illustrated in FIG. 6, and can be alternately arranged with the non-transmission area NTA along the second direction (or X-axis direction).

In this case, as described above, the second signal lines including gate lines GL and sensing control lines SCL can be provided along the second direction (or X-axis direction). Accordingly, the second signal lines may cross the transmission area TA provided along the first direction (or Y-axis direction). For example, the second signal lines can extend from the non-transmissive area NTA to the transmission area TA, and can extend through the transmission area TA to another non-transmission area NTA.

As another example, the transmission area TA can be arranged to surround the non-transmission area NTA, or the non-transmission area NTA can be arranged to surround the transmission area TA In the following description, when it is not required to differentiate the four pixels P1, P2, P3, and P4 configuring the unit pixel UP, each of the four pixels can be referred to as a pixel P.

Each of the pixels P can be provided with a color filter. A color of light emitted from each pixel P can be determined by a color of the color filter.

However, each of the pixels P may not be provided with a color filter, and in this case, the light emitting device provided in each of the pixels P may output light of any one color.

A transmission area TA can be provided on the left or right side of the four pixels P1, P2, P3, and P4 provided in the unit pixel UP.

For example, on the left side of the first pixels P1 and the third pixels P3 provided on the left side of an nth data line DLn provided in the substrate 101, a transmission area TA (for example, a first transmission area) through which light transmits can be provided. Moreover, on the right side of the second pixels P2 and the fourth pixels P4 provided on the right side of the nth data line DLn, a transmission area TA (for example, a second transmission area) through which light transmits can be provided.

A light emitting device ED can be provided in each of the light emitting area EA1, EA2, EA3, and EA4. The light emitting device ED can include an anode supplied with a first voltage EVDD through the driving transistor Tdr, a cathode connected to a second voltage supply line PLB through which a second voltage is supplied, and a light emitting layer provided between the anode and the cathode. The rectangular box indicated as a light emitting area EA in FIG. 6 can be an anode. For example, the anodes configuring the pixels P can be electrically and physically separated from each other, and light can be output from the light emitting layer overlapping the anode.

Accordingly, the range of the pixel P can be determined by the anode, and the range of the light emitting area EA can be determined by the anode. Therefore, hereinafter, for convenience of description, the rectangular box indicated as the light emitting area EA in FIG. 6 can be represented as an anode.

In this case, the light emitting device ED provided in the light emitting area EA can be connected to the test light emitting device TED provided in the transmission area TA on the left or right side of the light emitting area EA.

The test light emitting device TED can be provided between the light emitting device ED and the sensing control line SCL connected to the gate of the sensing transistor Tsw2 provided in the pixel P in a plan view of the light emitting display apparatus as shown in FIG. 2. For example, the test light emitting device TED can be connected to the anode of the light emitting device ED and the gate of the sensing transistor Tsw2.

Here, the sensing control line SCL can be one of the second signal lines extending from the emitting area EA to the transmission area TA, as described above. For example, the second signal lines can be provided along the second direction (or X-axis direction), cross the transmission area TA provided along the first direction (or Y-axis direction), extend from the non-transmission area NTA to the transmission area TA, and extend through the transmission area TA to another non-transmission area NTA.

Particularly, the anode of the light emitting device ED provided in the light emitting area EA can be connected to an anode of the test light emitting device TED (hereinafter, simply referred to as a test anode).

For example, as described above, when the square box indicated as the light emitting area EA in FIG. 6 is the anode of the light emitting device ED provided in the light emitting area EA, the anode of the light emitting device ED can be connected to the test light emitting device TED provided in the transmission area TA on the left or right side of the light emitting area EA.

To provide an additional description, the transmission area TA can be provided on the left or right side of the light emitting area EA.

For example, when the transmission area TA is provided on the left side of the light emitting area EA, the anode of the light emitting device in the light emitting area EA can extend to the transmission area TA on the left side, and can be connected to the test anode of the test light emitting device TED in the transmission area TA.

When the transmission area TA is provided on the right side of the light emitting area EA, the anode of the light emitting device in the light emitting area EA can extend to the transmission area TA on the right side, and can be connected to the test anode of the test light emitting device TED in the transmission area TA.

In this case, because the pixel P provided in the light emitting area EA is provided with the sensing transistor Tsw2 connected to the sensing control line SCL, the light emitting area EA can be adjacent to the sensing control line SCL.

Accordingly, the test light emitting device TED can also be adjacent to the sensing control line SCL. Therefore, the test light emitting device TED can be connected to the sensing control line SCL, and particularly, a cathode (hereinafter, simply referred to as a test cathode) of the test light emitting device TED can be connected to the sensing control line SCL.

In this case, a light emitting display panel in which one sensing control line SCL is connected to pixels at an upper end of the sensing control line SCL and connected to pixels at a lower end of the sensing control line SCL is illustrated in FIG. 6. Therefore, a light emitting display panel in which the test light emitting device TED provided at the upper end of the sensing control line SCL and the test light emitting device TED provided at the lower end of the sensing control line SCL are connected to one sensing control line SCL is illustrated in FIG. 6.

However, when the sensing control line SCL is connected only to pixels provided in a row in the second direction (X-axis direction), only test light emitting devices TED provided at an upper end of the sensing control line SCL can be connected to the sensing control line SCL, or only test light emitting devices TED provided at a lower end of the sensing control line SCL can be connected to the sensing control line SCL.

Here, the upper or lower end of the sensing control line SCL means an upward or downward direction of the sensing control line SCL illustrated in FIG. 6.

To provide an additional description, the number and structure of test light emitting devices TED connected to the sensing control line SCL can vary depending on the structure of the pixel driving circuit PDC and the driving method of the pixel driving circuit, etc.

The connection structure of the test light emitting device TED, the light emitting device ED, and the sensing control line SCL is described with reference to FIG. 2.

As described in FIG. 2 and above, the test light emitting device TED can be provided between the light emitting device ED and the sensing control line SCL connected to the gate of the sensing transistor Tsw2 provided in the pixel P in the plan view.

For example, the test light emitting device TED can include a test anode connected to the anode of the light emitting device ED, a test light emitting layer provided on the test anode, and a test cathode provided on the test light emitting layer and connected to the gate of the sensing transistor Tsw2 in the pixel P.

In this case, the first terminal of the sensing transistor Tsw2 can be connected to the anode of the light emitting device ED and the test anode, the second terminal of the sensing transistor Tsw2 can be connected to the sensing line SL, and the gate of the sensing transistor Tsw2 can be connected to the sensing control line SCL and the test cathode.

Hereinafter, a method of determining the cause of defective pixels by using a light emitting display apparatus according to an embodiment of the present disclosure will be described with reference to FIGS. 7 to 9.

Figure 7:
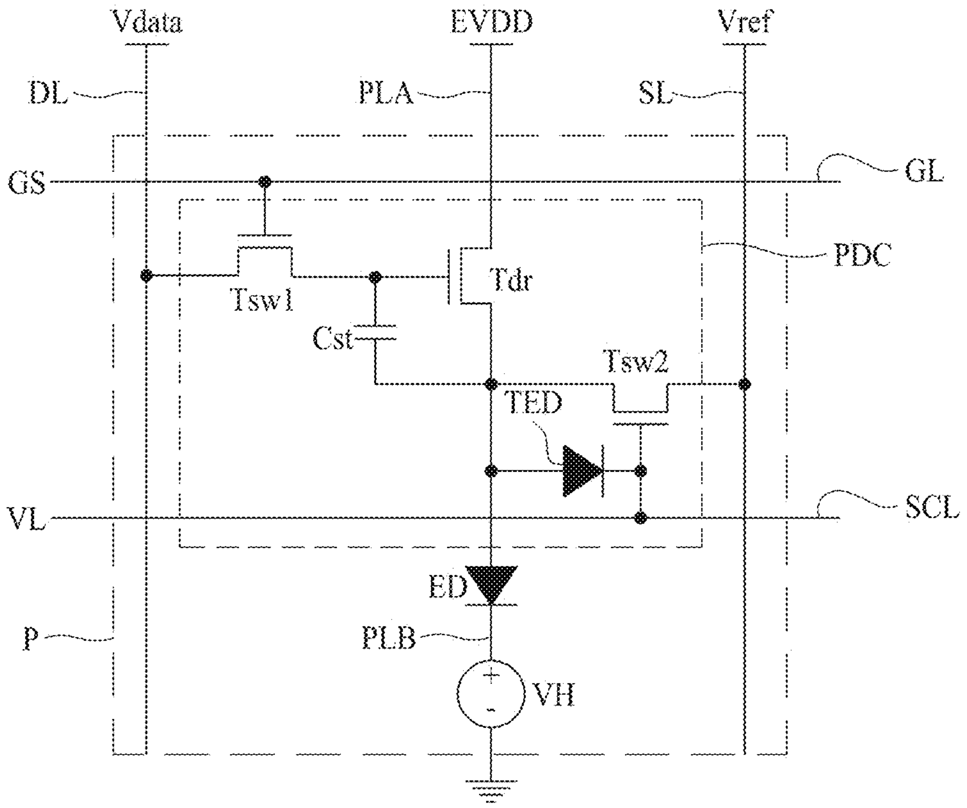
FIG. 7 is another exemplary diagram illustrating a structure of a pixel applied to a light emitting display apparatus according to an embodiment of the present disclosure.
Figure 8:
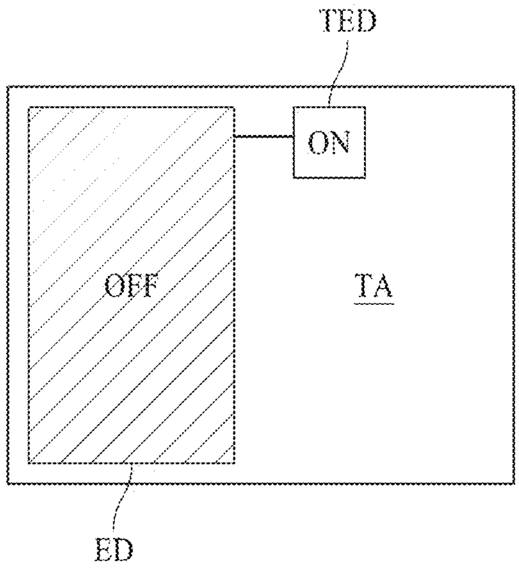
FIG. 8 is an exemplary diagram illustrating a light emitting area and a transmission area applied to a light emitting display apparatus according to an embodiment of the present disclosure.
Figure 9:
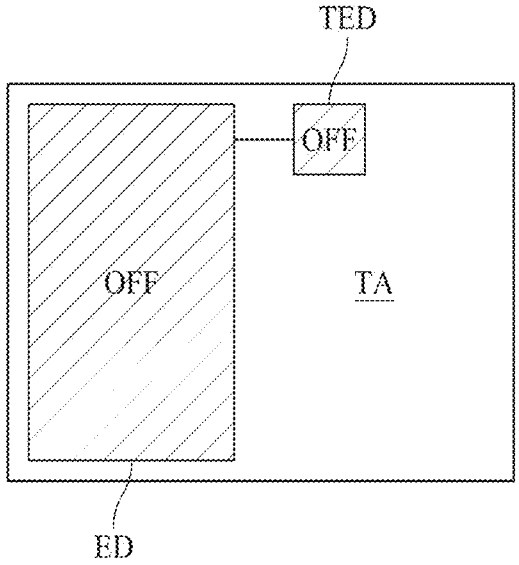
FIG. 9 is another exemplary diagram illustrating a light emitting area and a transmission area applied to a light emitting display apparatus according to an embodiment of the present disclosure.

FIG. 7 is another exemplary diagram illustrating a structure of a pixel applied to a light emitting display apparatus according to an embodiment of the present disclosure, FIG. 8 is an exemplary diagram illustrating a light emitting area and a transmission area applied to a light emitting display apparatus according to an embodiment of the present disclosure, and FIG. 9 is another exemplary diagram illustrating a light emitting area and a transmission area applied to a light emitting display apparatus according to an embodiment of the present disclosure.

First, during the manufacturing process of the light emitting display apparatus according to an embodiment of the present disclosure, a defective pixel determination process can be performed in order to determine whether there is a defective pixel.

The defective pixel determination process can be performed directly by the user's eyes, but can also be performed using various types of optical devices.

For the light emitting display panel determined to have defective pixels, a process of determining the cause of the defective pixels can be performed.

To this end, as illustrated in FIG. 7, a high voltage VH can be supplied to the cathodes of the light emitting devices ED, and a low voltage VL that is less than the high voltage VH can be supplied to the sensing control lines SCL. The high voltage VH can be, for example, the first voltage EVDD, and the low voltage VL can be, for example, the second voltage EVSS. Particularly, the second voltage EVSS can be the ground voltage.

For example, a defect cause determination device can supply the high voltage VH to the cathode commonly provided in the light emitting devices ED of the light emitting display panel 100, and supply the low voltage VL to the sensing control line SCL provided in the light emitting display panel 100.

However, when the light emitting display apparatus is used by the user, a low voltage (e.g., the second voltage EVSS) is supplied to the cathode of the light emitting devices ED, as illustrated in FIG. 2, and a high voltage (e.g., the first voltage EVDD) higher than the low voltage is supplied to the anodes of the light emitting devices ED, and a sensing control signal SCS turning on or off the sensing transistor Tsw2 is supplied to the sensing control lines SCL.

In other words, in the process of determining the cause of defective pixels, a high voltage (for example, the first voltage EVDD) is supplied to the cathode of the light emitting devices ED, and when the light emitting display apparatus is used by the user, a low voltage (for example, the second voltage EVSS) is supplied to the cathode of the light emitting devices ED.

In this case, the control driver 400, the gate driver 200, and the data driver 300 are driven normally. Accordingly, the pixel driving circuit PDC can be driven in the same method as when the light emitting display apparatus is used by the user.

Therefore, when the defective cause of the defective pixel is the light emitting device ED and the pixel driving circuit PDC is normal, no light is output from the light emitting device ED and light is output from the test light emitting device TED, as illustrated in FIG. 8. That is, the defective light emitting device ED is turned off, and the test light emitting device TED is turned on.

For example, when the light emitting device ED is defective and the pixel driving circuit PDC is normal, the anode and cathode of the light emitting device ED may be shorted. Accordingly, the high voltage VH supplied to the cathode of the light emitting device ED can be supplied to the test anode of the test light emitting device TED, as illustrated in FIG. 7. Further, the current and voltage generated in the pixel driving circuit PDC can also be supplied to the test anode of the test light emitting device TED.

In this case, because the test cathode is connected to the sensing control line SCL, the low voltage VL can be supplied to the test cathode through the sensing control line SCL.

That is, the high voltage VH, for example, the first voltage EVDD, can be supplied to the test anode of the test light emitting device TED, and the low voltage VL, for example, the second voltage EVSS can be supplied to the test cathode of the test light emitting device TED.

Therefore, a normal voltage can be supplied to the test anode and test cathode of the test light emitting device TED. Accordingly, the test light emitting device TED can be turned on, and thus, light can be output from the test light emitting device TED, as illustrated in FIG. 8.

In this case, the user can determine that the cause of the defective pixel is in the light emitting device.

Afterwards, the user can conduct a more precise analysis of the light emitting device ED provided in the defective pixel, and based on this, a repair process to repair the light emitting device ED can be performed.

Finally, as described above, in order to determine the cause of the defective pixel, the high voltage VH can be supplied to the cathodes, as illustrated in FIG. 7, and the low voltage VL that is less than the high voltage VH can be supplied to the sensing control lines SCL.

In this case, the control driver 400, the gate driver 200, and the data driver 300 are driven normally. Accordingly, the pixel driving circuit PDC can be driven in the same method as when the light emitting display apparatus is used by the user.

Therefore, when the cause of the defective pixel is the pixel driving circuit PDC and the light emitting device ED is normal, no light is output from the light emitting device ED and light is also not output from the test light emitting device TED, as illustrated in FIG. 9. That is, the normal light emitting device ED is turned off, and the test light emitting device TED is also turned off.

For example, because the high voltage (for example, the first voltage EVDD) is supplied to the anode and cathode of the normal light emitting device ED, light is not output from the light emitting device ED. Therefore, the high voltage VH supplied to the cathode of the light emitting device ED cannot be supplied to the test anode of the test light emitting device TED. Accordingly, the test light emitting device TED cannot be driven by the high voltage VH supplied to the cathode of the light emitting device ED, and thus cannot output light.

In this case, if the pixel driving circuit PDC is driven normally, the driving transistor Tdr can be turned on normally, and thus, the first voltage EVDD, which is a high voltage, can be supplied to the test anode of the test light emitting device TED, and current can be supplied to the test anodes through the driving transistor Tdr. In this case, because the test cathode is connected to the sensing control line SCL, the low voltage VL can be supplied to the test cathode through the sensing control line SCL.

Accordingly, if the pixel driving circuit PDC is driven normally, the first voltage EVDD and current can be supplied to the anode of the test light emitting device TED, and thus, light can be output from the test light emitting device TED.

However, if the pixel driving circuit PDC is defective, the driving transistor Tdr cannot be turned on normally. Accordingly, the first voltage EVDD, which is a high voltage, and current cannot be supplied to the test anode, and thus, light cannot be output from the test light emitting device TED.

Therefore, as illustrated in FIG. 9, when both the light emitting device ED and the test light emitting device TED are turned off, the user can determine that the cause of the defective pixel is in the pixel driving circuit PDC.

Afterwards, the user can conduct a more precise analysis of the pixel driving circuit PDC provided in the defective pixel, and based on this, a repair process to repair the pixel driving circuit PDC can be performed.

That is, according to the light emitting display apparatus according to an embodiment of the present disclosure, it can be confirmed whether the defective pixel is caused by a defect in the light emitting device or a defect in the pixel driving circuit PDC.

If the cause of the defect is identified, a repair process which can solve the cause of the defect can proceed more quickly and more accurately.

Accordingly, the yield rate of a light emitting display panel can be enhanced, and the manufacturing period of a light emitting display apparatus including the light emitting display panel can be shortened.

Hereinafter, the detailed structure of the light emitting display apparatus according to an embodiment of the present disclosure for performing the functions described above will be described with reference to FIGS. 10 to 15. In the following description, details which are the same as or similar to details described with reference to FIGS. 1 to 9 are omitted or will be briefly described.

Figure 10:
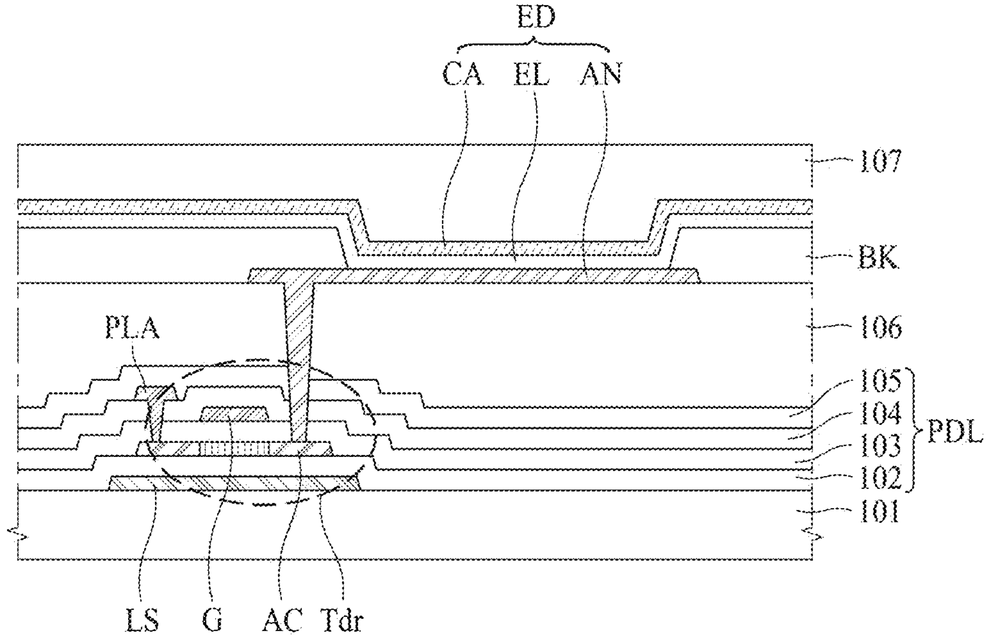
FIG. 10 is an exemplary diagram illustrating a cross-sectional surface of a light emitting display panel applied to a light emitting display apparatus according to an embodiment of the present disclosure.

FIG. 10 is an exemplary diagram illustrating a cross-sectional surface of a light emitting display panel applied to a light emitting display apparatus according to an embodiment of the present disclosure. Particularly, a cross-sectional surface of an area where a driving transistor Tdr and a light emitting device ED are provided in a light emitting display panel is illustrated in FIG. 10. That is, FIG. 10 illustrates a cross-sectional surface of a pixel P.

As illustrated in FIG. 10, the light emitting display panel 100 applied to the light emitting display apparatus according to an embodiment of the present disclosure can include a substrate 101, a pixel driving circuit layer PDL provided on the substrate 101, a planarization layer 106 provided on the pixel driving circuit layer PDL to cover the pixel driving circuit layer PDL, an anode AN (e.g., an anode electrode) provided on the planarization layer 106, a light emitting layer EL provided on the anode AN, a cathode CA (e.g., a cathode electrode) provided on the light emitting layer EL, and an encapsulation layer 107 covering the cathode CA.

First, the substrate 101 can be a glass substrate or a plastic substrate, but is not limited thereto and can be formed of one of various kinds of films.

The pixel driving circuit layer PDL including a driving transistor Tdr can be provided on the substrate 101.

A pixel driving circuit PDC including the driving transistor Tdr can be provided in the pixel driving circuit layer PDL. The pixel driving circuit PDC, as described above with reference to FIG. 2, can include a switching transistor Tsw1, a storage capacitor Cst, a driving transistor Tdr, and a sensing transistor Tsw2. For example, at least two transistors can be provided in the pixel driving circuit layer PDL.

Each of the transistors can include an active layer AC including a semiconductor, a gate insulation layer 103 which is provided on the active layer AC, and a gate G which is provided on the gate insulation layer 103.

The gate G can be covered by the gate insulation layer 104, and various electrodes or lines can be provided on the gate insulation layer 104.

An electrode or a line provided on the insulation layer 104 can be covered by a passivation layer 105, and the passivation layer 105 can be covered by the planarization layer 106.

For example, the driving transistor Tdr illustrated in FIG. 10 can include an active layer AC provided on the buffer 102, a gate insulation layer 103 provided on the active layer AC, a gate G provided on the insulation layer 103, an insulation layer 104 covering an upper end of the gate G, a first voltage supply line PLA connected to a first terminal of the driving transistor Tdr, and a passivation layer 105 covering the first voltage supply line PLA. In this case, other transistors provided in the pixel driving circuit PDC can also be formed in a similar shape to the driving transistor Tdr illustrated in FIG. 10.

However, the structure of the driving transistor Tdr and other transistors is not limited to the structure of the driving transistor Tdr illustrated in FIG. 10. Accordingly, the structures of the driving transistor Tdr and other transistors can be changed into various shapes.

In this case, as illustrated in FIG. 10, a light blocking plate LS can be provided at a lower end of the driving transistor Tdr in order to block external light which incidents on the active layer AC during the manufacturing process of the light emitting display apparatus or while the light emitting display apparatus is in use.

The light blocking plate LS can be connected to any one of a gate, first terminal, and second terminal of the driving transistor Tdr.

Another light blocking plate formed on the same layer as the light blocking plate LS can be used as various lines, for example, a data line.

Accordingly, each of the light blocking plate LS and another light blocking plate can be provided in a floating state or can be connected to a signal line to which a voltage is supplied.

A light blocking plate LS may or may not be provided at a lower end of other transistors provided in the pixel driving circuit layer PDL. That is, the light blocking plate LS can be provided not only at a lower end of the driving transistor Tdr, but also at a lower end of another transistor requiring light blocking, and can be provided in areas requiring light blocking among areas not provided with transistors.

The light blocking plate LS can be provided on the substrate 101, the light blocking plate LS can be covered by the buffer 102, and the active layer AC can be provided on the buffer 102.

Further, a data line DL, a gate line GL, a sensing control line SCL, a sensing line SL, and a first voltage supply line PLA which are connected to the pixel driving circuit PDC can be provided in the pixel driving circuit layer PDL.

Hereinafter, a generic name for the data line DL, the gate line GL, the sensing control line SCL, the sensing line SL, and the first voltage supply line PLA can be a signal line. That is, at least one signal line can be provided in the pixel driving circuit layer PDL.

Moreover, as described above, the signal lines can include first signal lines extending in the first direction (or Y-axis direction) in the non-transmission area NTA and second signal lines extending in the second direction (or X-axial direction) different from the first direction in the non-transmission are NTA. For example, the first signal lines can include data lines DL and sensing lines SL, and the second signal lines can include gate lines GL and sensing control lines SCL.

Each of the buffer 102, the gate insulation layer 103, the insulation layer 104, and the passivation layer 105 can be formed of at least one inorganic layer, or at least one organic layer, or at least one inorganic layer and at least one organic layer. The buffer 102, the gate insulation layer 103, the insulation layer 104, and the passivation layer 105 can perform an insulation function. Accordingly, each of the buffer 102, the gate insulation layer 103, the insulation layer 104, and the passivation layer 105 can be referred to as an insulation functional layer.

A gate of the driving transistor Tdr, the light blocking plate LS, and the signal lines are metal. Accordingly, a layer provided with at least one of the gate, the light blocking plate LS, and the signal line can be referred to as a metal layer.

That is, the pixel driving circuit layer PDL can include at least two metal layers and at least two insulation functional layers.

A planarization layer 106 can be provided on the pixel driving circuit layer PDL.

The planarization layer 106 can perform a function of planarizing an upper surface of the pixel driving circuit layer PDL, which is not flat. To this end, the planarization layer 106 can be formed to have a thickness greater than the pixel driving circuit layer PDL, and accordingly, the upper surface of the planarization layer 106 can be planarized.

The planarization layer 106 can be formed of at least one organic layer, or at least one inorganic layer, or at least one inorganic layer and at least one organic layer.

An anode AN can be provided on the planarization layer 106. The anode can configure the light emitting device ED.

As illustrated in FIGS. 2 and 10, the anode AN is electrically connected to the driving transistor Tdr provided in the pixel driving circuit layer PDL, and is patterned for each pixel P. Accordingly, the anodes AN provided in the pixels P are physically and electrically separated from each other.

The anode AN can be formed of a transparent metal such as indium tin oxide (ITO) or indium zinc oxide (IZO), and can be formed of an opaque metal such as silver (Ag), aluminum (Al), copper (Cu), molybdenum (Mo), titanium (Ti), nickel (Ni), chromium (Cr), and tungsten (W).

A bank BK can be provided in the planarization layer 106 and can include an opening portion through which the anode AN is exposed.

For example, the bank BK covers the outer edges of the anode AN to form the opening portion through which light is output from the pixel P. That is, an area which is not covered by the bank BK in the anode AN illustrated in FIG. 10 is the opening portion. The opening portion can be the light emitting area EA.

To provide an additional description, the bank BK covers the outer edges of the anode AN and can be provided in the display area DA of the substrate 101 so that the anode AN is exposed.

The bank BK can prevent or at least reduce light from overlapping between adjacent pixels.

The bank BK can be formed of at least one inorganic layer, or at least one organic layer, or at least one inorganic layer and at least one organic layer.

The light emitting layer EL can be provided on the entire surface of the substrate 101 to cover the anode AN and the bank BK.

The light emitting layer EL can include one of an organic light emitting layer, an inorganic light emitting layer, and a quantum dot light emitting layer. Alternatively, the light emitting layer EL can include a stack or combination structure of the organic light emitting layer (or the inorganic light emitting layer) and the quantum dot light emitting layer.

The light emitting layer EL can include a hole injection layer (HIL), a hole transport layer (HTL), a hole blocking layer (HBL), an electron injection layer (EIL), an electron transport layer (ETL), an electron blocking layer (EBL), and a charge generating layer (CGL).

In a case where the light emitting layer EL emits white light, the light emitting layer EL can include a hole injection layer (HIL)/hole transport layer (HTL), a blue organic layer, an electron injection layer (EIL)/charge generating layer (CGL)/electron transport layer (ETL), a red organic layer, a yellow green organic layer, an electron injection layer (EIL)/ charge generating layer (CGL)/electron transport layer (ETL), a blue organic layer, an electron injection layer (EIL)/electron transport layer (ETL), and an organic buffer, which are sequentially stacked on the anode AN.

The light emitting layer EL can include a plurality of layers having various stack orders, in addition to layers having a stack order as described above.

The cathode CA can be provided on the light emitting layer EL, and particularly, may can be provided in a plate shape in the display area DA and the non-display area NDA.

For example, the cathodes CA configuring the light emitting devices ED can be formed as one plate. Accordingly, the cathode CA described below can mean an electrode covering one light emitting device ED, or mean an electrode covering all light emitting devices ED.

However, the cathode CA can be provided in the display area DA so as to be separated from the test cathode provided in the transmission area TA.

In a case where the light emitting device ED emits white light, a color filter can be provided under the anode AN or on the cathode.

For example, when the light emitting display panel 100 uses a top emission type, the color filter can be provided at an upper end of the cathode CA, and when the light emitting display panel 100 uses a bottom emission type, the color filter can be provided at a lower end of the anode AN.

Finally, the cathode CA can be covered by an encapsulation layer 107.

The encapsulation layer 107 can be formed of at least one organic layer, or at least one inorganic layer, or at least one inorganic layer and at least one organic layer.

Moisture and oxygen flowing in from the outside are blocked by the encapsulation layer 107 and may not flow into the light emitting layer EL.

A color filter can be provided on the encapsulation layer 107. In this case, the color filter and encapsulation layer 107 can be covered by an encapsulation substrate.

However, as described above, the color filter can be provided at the lower end of the anode AN.

The cross-sectional structure described above can be commonly applied to all light emitting areas EA illustrated in FIG. 6.

Figure 11:
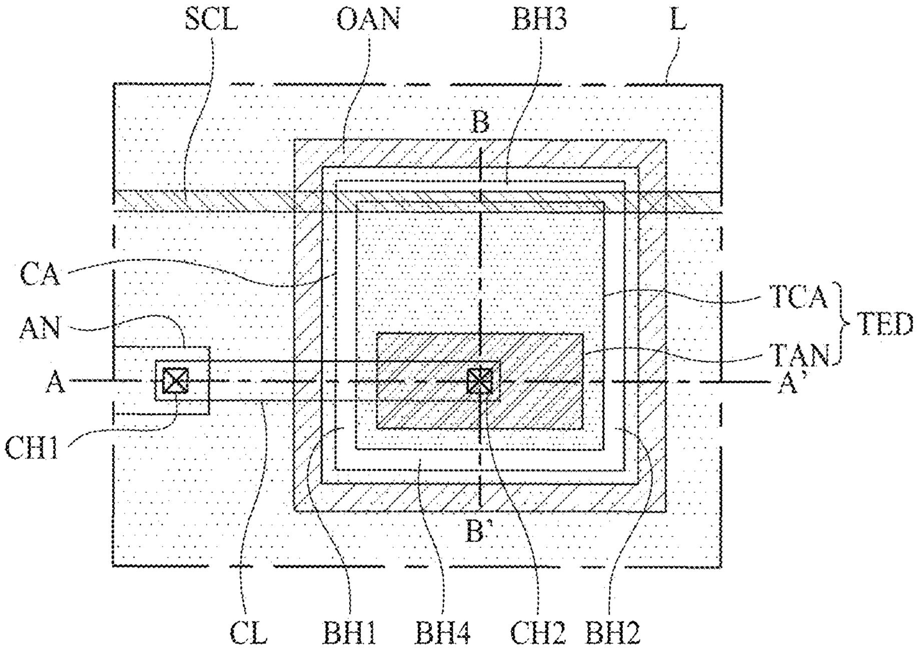
FIG. 11 is a plan view illustrating a region A of FIG. 6 according to an embodiment of the present disclosure.
Figure 12:
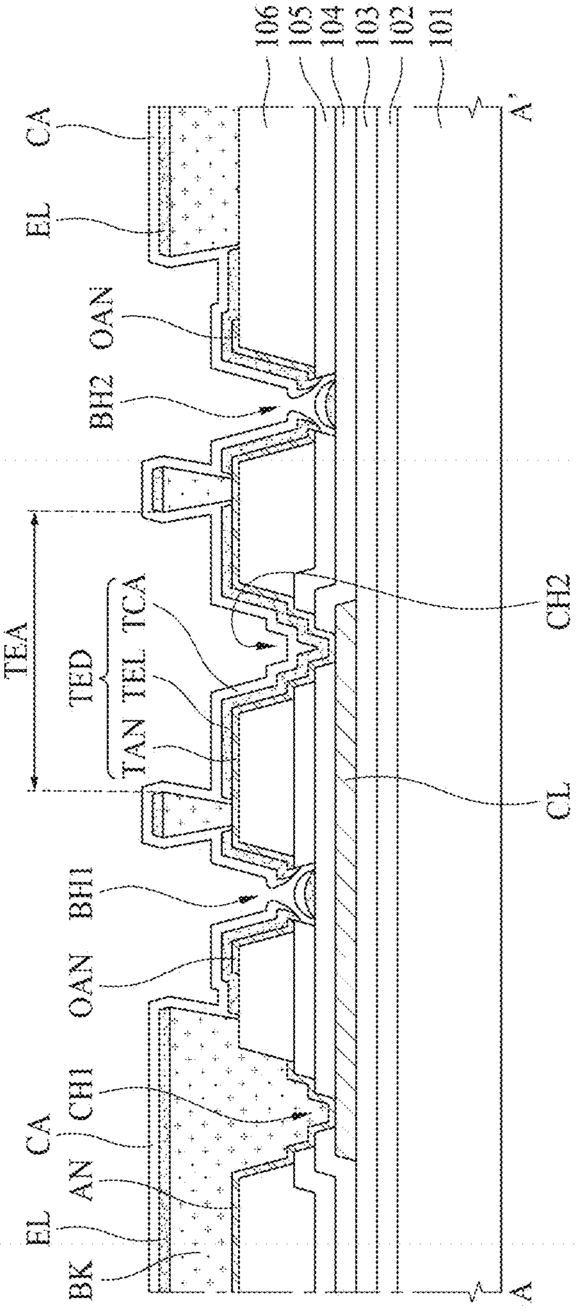
FIG. 12 is an exemplary diagram illustrating a cross-sectional surface taken along line A-A' of FIG. 11 according to an embodiment of the present disclosure.
Figure 13:
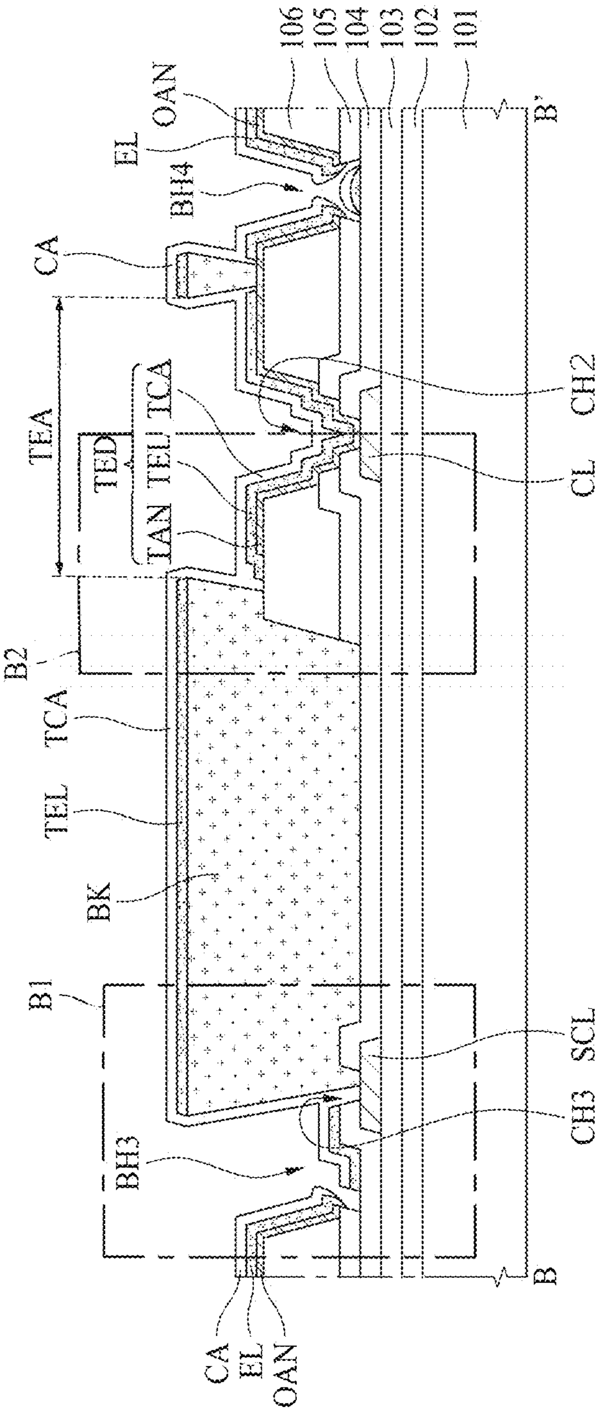
FIG. 13 is an exemplary diagram illustrating a cross-sectional surface taken along line B-B' of FIG. 11 according to an embodiment of the present disclosure.
Figure 14:
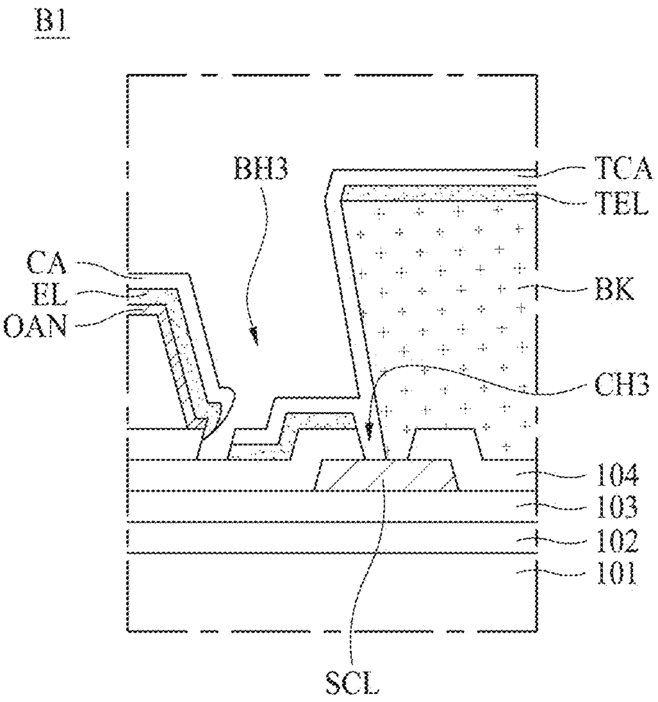
FIG. 14 is an enlarged cross-sectional view of region B1 illustrated in FIG. 13 according to an embodiment of the present disclosure.
Figure 15:
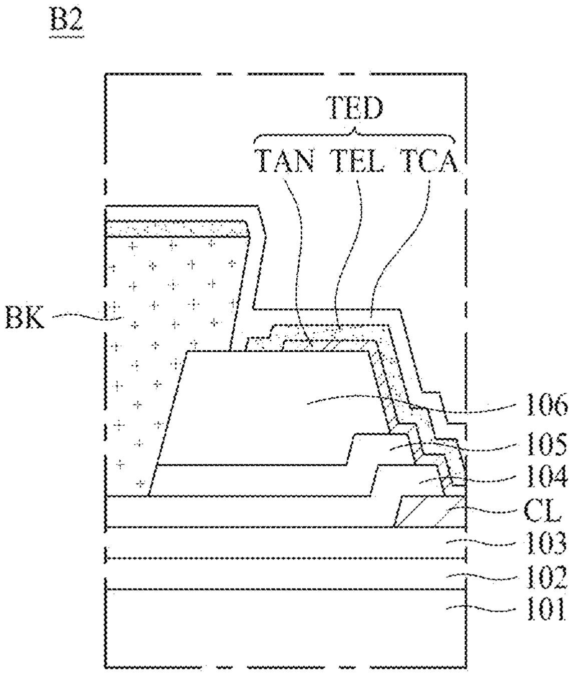
FIG. 15 is an enlarged cross-sectional view of region B2 illustrated in FIG. 13 according to an embodiment of the present disclosure.

FIG. 11 is a plan view illustrating a region A of FIG. 6 according to one embodiment, FIG. 12 is an exemplary diagram illustrating a cross-sectional surface taken along line A-A' of FIG. 11 according to one embodiment, FIG. 13 is an exemplary diagram illustrating a cross-sectional surface taken along line B-B' of FIG. 11 according to one embodiment, FIG. 14 is an enlarged cross-sectional view of region B1 illustrated in FIG. 13 according to one embodiment, and FIG. 15 is an enlarged cross-sectional view of region B2 illustrated in FIG. 13 according to one embodiment.

As described above, the test light emitting device TED can be connected to the light emitting device ED provided in the pixel P and can be provided in the transmission area TA.

For example, the test light emitting device TED provided in the transmission area TA can be connected to the light emitting device ED provided in the light emitting area EA.

In this case, the test light emitting device TED can be provided between the light emitting device ED and the sensing control line SCL connected to the gate of the sensing transistor Tsw2 provided in the pixel P.

The sensing control line SCL can extend from the light emitting area EA to the transmission area TA, and can extend through the transmission area TA to another light emitting area EA.

To this end, the test light emitting device TED, as illustrated in FIGS. 2 and 7, can include a test anode connected to the anode of the light emitting device ED, a test light emitting layer provided on the test anode, and a test cathode provided on the anode and connected to the gate of the sensing transistor Tsw2 provided in the pixel P.

In this case, the first terminal of the sensing transistor Tsw2 can be connected to the anode and the test anode, the second terminal of the sensing transistor Tsw2 can be connected to the sensing line SL, and the gate of the sensing transistor Tsw2 can be connected to the sensing control line SCL and the test cathode.

That is, as described in the description of FIG. 6 and as illustrated in FIGS. 11 to 15, the anode AN of the light emitting device ED is separated from an test anode TAN (e.g., a test anode electrode) of the test light emitting device TED, and can be electrically connected through a connection line CL to the test anode TAN.

To provide an additional description, the test anode TAN can be directly connected to the anode AN, or as illustrated in FIGS. 11 to 15, can be connected to the anode AN through the connection line CL provided in a layer different from the test anode TAN and the anode AN.

First, referring to FIG. 11, the test light emitting device TED including a test anode TAN (e.g., test anode electrode), a test cathode TCA (e.g., test cathode electrode), and a test light emitting layer can be surrounded by an outer anode OAN, and the anode AN can be spaced apart (e.g., separated from or disconnected) from the test anode TAN with the outer anode OAN interposed therebetween. In one embodiment, the outer anode OAN is not connected to the test anode TAN and the anode AN. As shown in FIG. 11, the outer anode OAN surrounds the boundary hole BH1, BH2, BH3, and BH4.

The anode AN and the test anode AN can be connected through a connection line CL. In this case, the connection line CL can be provided in a layer different from the test anode TAN and the anode TA.

In this case, the anode AN can be connected to a first side of the connection line CL through a first contact hole CH1, and the test anode TAN can be connected to a second side of the connection line CL through a second contact hole CH2.

That is, the test anode TAN, the anode AN, and the outer anode OAN can be formed in the same layer, but can be separated from each other, as described above. Particularly, the test anode TAN can be completely separated from the anode AN by the structure described above, and can be electrically connected to the anode AN by the connection line CL.

To provide an additional description, the outer anode OAN can be formed in the process of physically separating the test anode TAN and the anode AN.

The outer anode OAN can be provided in the transmission area TA, but not the non-transmission area NTA (e.g., the light emitting area EA). In one embodiment, the outer anode surrounds the test light emitting device TED in a plan view of the light emitting display apparatus. That is, the outer anode OAN surrounding the test anode TAN can be provided in the transmission area TA together with the test anode TAN, and the anode AN can be provided in the light emitting area EA (or the non-transmission area NTA).

The light emitting layer EL and cathode CA extending from the light emitting area EA can be provided on the outer anode OAN. That is, as illustrated in FIG. 10, the light emitting layer EL and cathode CA configuring the light emitting device ED provided in the pixel P can extend to an upper end of the outer anode OAN.

The cathode CA provided on the outer anode OAN can be separated from the test cathode TCA provided on the test anode TAN. That is, the cathode CA on the outer anode OAN is disconnected from the test cathode TCA.

For example, the cathode CA and the test cathode TCA can be separated in a first boundary hole BH1, a second boundary hole BH2, a third boundary hole BH3, and a fourth boundary hole BH4. The first boundary hole BH1, the second boundary hole BH2, the third boundary hole BH3, and the fourth boundary hole BH4 surround the test cathode TCA and the test anode TAN.

To provide an additional description, the cathode CA of the light emitting device ED provided in the light emitting area EA as illustrated in FIG. 10 can extend to the transmission area TA, for example, can extend to the outer anode OAN surrounding the test light emitting device TED as illustrated in FIG. 11. In this case, the cathode CA can be separated from the test cathode TCA in the first to fourth boundary holes BH1 to BH4. That is, the test cathode TCA of the test light emitting device TED can be separated from the cathode CA of the light emitting device ED.

The test cathode TCA can be connected to the sensing control line SCL, as illustrated in FIGS. 6 and 11. As illustrated in FIG. 2, the sensing control line SCL can be connected to the gate of the sensing transistor Tsw2 provided in the pixel P, the first terminal of the sensing transistor Tsw2 can be connected to the anode AN of the light emitting device ED, and the second terminal of the sensing transistor Tsw2 can be connected to the sensing line SL.

The test cathode TCA and the cathode CA can be separated by an undercut provided on the outside of the test light emitting device TED. That is, an undercut between the test light emitting device TED and the light emitting device ED in the plan view of the light emitting display apparatus disconnects the test cathode TCA and the cathode CA from each other.

For example, as illustrated in FIG. 11, the first boundary hole BH1 to the fourth boundary hole BH4 are formed on the outside of the test light emitting device TED, and the undercut can be formed in the first boundary hole BH1 to the fourth boundary hole BH4.

In this case, bordering the undercut, the test cathode TCA cannot be extended any further, and bordering the undercut, the cathode CA cannot be extended any further.

For example, when a cathode material is deposited in the entire display area DA, the cathode material can be separated by the undercut. In this case, the cathode material provided on a side of the undercut can form the cathode CA, and the cathode material provided on the other side of the undercut can form the test cathode TCA.

Accordingly, the test cathode TCA and the cathode CA can be separated by the undercut provided on the outside of the test light emitting device TED. The undercut can be provided in the first to fourth boundary holes BH1 to BH4.

Next, FIG. 12 illustrates a cross-sectional surface taken along line A-A' illustrated in FIG. 11. That is, FIG. 12 illustrates a connection structure of the anode AN provided in the light emitting area EA and the test anode TAN provided in the transmission area TA, and illustrated an arrangement structure of the outer anode OAN and the test anode TAN.

The test light emitting device TED including the test anode TAN, the test cathode TCA, and the test light emitting layer TEL can be surrounded by the outer anode OAN, and the anode AN can be separated from the test anode TAN with the outer anode OAN therebetween. As shown in FIGS. 12-13, the test light emitting layer TEL is on the test anode TAN and the test cathode TCA is on the test light emitting layer TEL such that the test light emitting layer TEL is between the test anode TAN and the test cathode TCA.

The anode AN and the test anode TAN can be connected through the connection line CL. Particularly, the connection line CL can be provided on a layer different from the test anode TAN and the anode TA.

For example, as illustrated in FIG. 12, the connection line CL can be provided on the gate insulation layer 103, and the insulation layer 104, the passivation layer 105, and the planarization layer 106 can be provided on the connection line CL. The anode AN and the test anode TAN can be provided on the planarization layer 106.

The first contact hole CH1 passing through the planarization layer 106, the passivation layer 105, and the insulation layer 104 can be formed in an area where the anode AN and the connection line CL overlap. The second contact hole CH2 passing through the planarization layer 106, the passivation layer 105, and the insulation layer 104 can be formed in an area where the test anode TAN and the connection line CL overlap.

The first side of the connection line CL can be exposed through the first contact hole CH1, and the second side of the connection line CL can be exposed through the second contact hole CH2.

In this case, the anode AN can be connected to the first side of the connection line CL through the first contact hole CH1, and the test anode TAN can be connected to the second side of the connection line CL through the second contact hole CH2. In one embodiment, a portion of the test anode TAN, a portion of the test light emitting layer TEL, and a portion of the test cathode is disposed in the second contact hole CH2.

Accordingly, the anode AN can be connected to the test anode TAN through the connection line CL.

The test anode TAN, anode AN, and outer anode OAN can be formed in the same layer. However, as described above, the anode AN and the test anode TAN are separated from each other and can be connected by the connection line CL.

In this case, the outer anode OAN and the test anode TAN can be separated from each other in the first boundary hole BH1 and the second boundary hole BH2, and not electrically connected.

As illustrated in FIGS. 11 and 12, the first boundary hole BH1 to the fourth boundary hole BH4 can be formed on the outside of the test light emitting device TED, and the undercut can be formed in the first boundary hole BH1 to the fourth boundary hole BH4.

The undercut can be formed by a process in which the passivation layer 105 provided under the material (hereinafter simply referred to as an anode material) forming the outer anode OAN and the test anode TAN is etched more than the anode material in the etching process for forming the first boundary hole BH1 to the fourth boundary hole BH4. That is, in the first boundary hole BH1 to the fourth boundary hole BH4, an end of the outer anode OAN and an end of the test anode TAN protrude from an end of the passivation layer 105.

In the first boundary hole BH1 to the fourth boundary hole BH4, a space which is formed by the end of the anode OAN, the end of the test anode TAN, the passivation layer 105 provided under the anode AN, the passivation layer 105 provided under the end of the test anode TAN, and the insulation layer 104 provided under the passivation layer 105 is referred to as an undercut.

In this case, the test cathode TCA cannot be extended any further in the undercut, and the cathode CA cannot be extended any further in the undercut.

For example, when a cathode material is deposited on the anode AN and the test anode TAN, the cathode material cannot be provided continuously along the side surface forming the undercut. Accordingly, the cathode material can be separated in the undercut, and thus the test cathode TCA and the cathode CA can be separated by the undercut.

Next, FIG. 13 illustrates a cross-sectional surface taken along line B-B' illustrated in FIG. 11. That is, FIG. 13 illustrates an arrangement structure of the test anode TAN and the outer anode OAN which are provided in the transmission area TA.

As described above, in the area where the test anode TAN and the connection line CL overlap, the second contact hole CH2 penetrating the planarization layer 106, the passivation layer 105, and the insulation layer 104 can be formed.

The second side of the connection line CL can be exposed through the second contact hole CH2, and the test anode TAN can be connected to the second side of the connection line CL through the second contact hole CH2.

Accordingly, the anode AN can be connected to the test anode TAN through the connection line CL.

The outer anode OAN and the test anode TAN can be separated from each other in the first boundary hole BH1 to the fourth boundary hole BH4, and are not electrically connected.

In this case, the test anode TAN can extend to the first boundary hole BH1, the second boundary hole BH2, and the fourth boundary hole BH4, as shown in FIGS. 11 and 13. However, the test anode TAN may not extend to the third boundary hole BH3.

Accordingly, the test anode TAN and the outer anode OAN can be separated in the third boundary hole BH3. In this case, the test anode TAN may not be provided in the third boundary hole BH3. For example, in order to minimize the area of the test anode TAN, the test anode TAN may not extend to the third boundary hole BH3.

The undercut can be formed in the first to fourth boundary holes BH1 to BH4.

As described above, bordering the undercut, the test cathode TCA cannot extend any further, and bordering the undercut, the cathode CA cannot extend any further.

Next, FIG. 14 is an enlarged exemplary diagram of region B1 illustrated in FIG. 13.

The test light emitting device TED including the test anode TAN, the test cathode TCA, and the test light emitting layer TEL can be surrounded by the outer anode OAN, and the outer anode OAN can be spaced apart from the test anode TAN in the first boundary hole BH1 to the fourth boundary hole BH4.

Particularly, the third boundary hole BH3 can be provided with only the outer anode OAN, as illustrated in FIGS. 13 and 14, and accordingly, the outer anode OAN can be separated from the test anode TAN.

A light emitting layer EL and a cathode CA which extend from the light emitting area EA can be provided on the outer anode OAN. That is, as illustrated in FIG. 10, the light emitting layer EL and cathode CA which configure the light emitting device ED provided in the pixel P can extend to an upper end of the outer anode OAN.

In this case, the cathode CA provided on the outer anode OAN can be separated from the test cathode TCA provided on the test anode TAN. Thus, the cathode CA is not electrically connected to the test cathode TCA.

For example, the cathode CA and the test cathode TCA can be separated in the first boundary hole BH1, the second boundary hole BH2, the third boundary hole BH3, and the fourth boundary hole BH4.

That is, the first boundary hole BH1 to the fourth boundary holes BH4 are formed on the outside of the test light emitting device TED, and the undercut can be formed in the first boundary hole BH1 to the fourth boundary hole BH4. In one embodiment, the undercut is a structure (e.g., an undercut structure) including an upper surface that extends past a lower surface of the undercut structure and an angled end that is between the end up the upper surface and the lower surface of the undercut structure.

Accordingly, the light emitting layer EL and the cathode CA which extend from the light emitting area EA to the third boundary hole BH3 can be separated from the test cathode TCA and the test light emitting layer TEL by the undercut provided in the third boundary hole BH3.

In this case, a third contact hole CH3 in which the sensing control line SCL is exposed can be provided in an area adjacent to the third boundary hole BH3, as illustrated in FIG. 14.

For example, as illustrated in FIG. 14, the sensing control line SCL can be provided on the gate insulation layer 103, and a portion of the sensing control line SCL can be exposed through the third contact hole CH3 formed by removing at least one of the insulation layer 104, the passivation layer 105, and the planarization layer 106. That is, a portion of the sensing control line SCL is overlapped by a portion of the boundary hole (e.g., BH3). A portion of the test cathode electrode TCA is directly connected to the portion of the sensing control line SCL in the boundary hole BH3 via the third contact hole CH3.

In this case, the test cathode TCA can be connected to the sensing control line SCL through the third contact hole CH3.

Accordingly, the test cathode TCA can be supplied with a low voltage VL from the sensing control line SCL in the process of determining the cause of the defective pixel.

Finally, FIG. 15 is an enlarged exemplary diagram of region B2 illustrated in FIG. 13.

That is, as described with reference to FIG. 14, the test cathode TCA can be connected to the sensing control line SCL through the third contact hole CH3. In this case, the test cathode TCA can be provided on the bank BK, as illustrated in FIG. 15, and the test light emitting layer TEL can be provided between the bank BK and the test cathode TCA.

The test anode TAN can be provided on the planarization layer 106 formed lower than the bank BK.

In this case, the test light emitting layer TEL and the test cathode TCA which are provided on the bank BK can extend along the side surface of the bank BK, as illustrated in FIG. 15, to be provided on the test anode TAN.

Accordingly, the test light emitting device TED including the test anode TAN, the test light emitting layer TEL, and the test cathode TCA can be formed.

According to the present disclosure as described above, the test light emitting device TED can be formed in a shape independent from the light emitting device ED and can be formed in a size much smaller than the light emitting device ED.

The test light emitting device TED can be used in the process of determining the cause of the defective pixel, and it can be determined whether the defective cause of the defective pixel is caused by the light emitting device ED or the pixel driving circuit PDC, using the test light emitting device TED.

When the light emitting display apparatus is used by a user, a sensing control signal SCS which can turn on or turn off the sensing transistor Tsw2 is supplied to the test cathode TCA of the test light emitting device TED. Therefore, light may not be output from the test light emitting device TED by the sensing control signal SCS.

However, even if light is output from the test light emitting device TED by the sensing control signal SCS, because the size of the test light emitting device TED can be formed much smaller than the size of the light emitting device ED, the light output from the test light emitting device TED may not be recognized by the user.

The features of the light emitting display apparatus according to an embodiment of the present disclosure are briefly summarized as follows.

A light emitting display apparatus according to an embodiment of the present disclosure comprises a substrate including a light emitting area where an image is displayed and a transmission area through which light transmits, a pixel provided in the light emitting area, and a test light emitting device connected to a light emitting device provided in the pixel and provided in the transmission area.

The test light emitting device is provided between the light emitting device and a sensing control line connected to a gate of a sensing transistor provided in the pixel.

The sensing control line extends from the light emitting area to the transmission area.

The test light emitting device includes a test anode connected to an anode of the light emitting device, a test light emitting layer provided on the test anode, and a test cathode provided on an upper end of the test anode and connected to a gate of a sensing transistor provided in the pixel.

A first terminal of the sensing transistor is connected to an anode of the light emitting device and the test anode, a second terminal of the sensing transistor is connected to a sensing line, and a gate of the sensing transistor is connected to a sensing control line and the test cathode.

The test anode is connected to the anode through a connection line provided on a layer different from the test anode and the anode.

The test light emitting device is surrounded by an outer anode, and the anode is spaced apart from a test anode configuring the test light emitting device with the outer anode interposed therebetween.

The anode and the test anode are connected through a connection line.

The anode is connected to one side of the connection line through a first contact hole, and the test anode is connected to the other side of the connection line through a second contact hole.

The outer anode is provided in the transmission area.

A light emitting layer and a cathode which extend from the light emitting area are provided on the outer anode.

The cathode provided on the outer anode is separated from a test cathode provided on the test anode.

A test cathode of the test light emitting device is separated from a cathode of the light emitting device.

The test cathode is connected to a sensing control line, the sensing control line is connected to a gate of a sensing transistor provided in the pixel, a first terminal of the sensing transistor is connected to an anode of the light emitting device, and a second terminal of the sensing transistor is connected to a sensing line.

The test cathode and the cathode are separated by an undercut provided on the outside of the test light emitting device.

An anode of the light emitting device is connected to a test anode of the test light emitting device.

The light emitting display apparatus according to the present disclosure can be applied to all electronic devices including a light emitting display panel. For example, the light emitting display apparatus according to the present disclosure can be applied to a virtual reality (VR) device, an augmented reality (AR) device, a mobile device, a video phone, a smart watch, a watch phone, or a wearable device, foldable device, rollable device, bendable device, flexible device, curved device, electronic notebook, e-book, PMP (portable multimedia player), PDA (personal digital assistant), MP3 player, mobile medical device, desktop PC, laptop PC, netbook computer, workstation, navigation, car navigation, vehicle display devices, televisions, wall paper display devices, signage devices, game devices, laptops, monitors, cameras, camcorders, and home appliances.

According to the light emitting display apparatus according to an embodiment of the present disclosure, during a manufacturing process of the light emitting display apparatus, it can be clearly determined whether the cause of the defective pixel is the light emitting device or the pixel driving circuit. Accordingly, an appropriate repair process for the defective pixel can be performed.

Accordingly, the final number of defective pixels can be reduced, and the number of defective light emitting display panels can be reduced.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A light emitting display apparatus comprising:

a substrate including a light emitting area where an image is displayed and a transmission area through which external light transmits;

a pixel in the light emitting area, the pixel comprising a light emitting device; and a test light emitting device in the transmission area, the test light emitting device connected to the light emitting device included in the pixel, wherein a signal which is supplied to a test cathode of the test light emitting device is different from a signal which is supplied to a cathode of the light emitting device.

2. The light emitting display apparatus of claim 1, wherein the pixel further comprises:

a sensing transistor including a gate, wherein the test light emitting device is between the light emitting device and a sensing control line that is connected to the gate of the sensing transistor in a plan view of the light emitting display apparatus.

3. The light emitting display apparatus of claim 2, wherein the sensing control line extends from the light emitting area to the transmission area.

4. The light emitting display apparatus of claim 1, wherein the test light emitting device includes:

a test anode connected to an anode of the light emitting device;

a test light emitting layer on the test anode; and a test cathode on the test light emitting layer such that the test light emitting layer is between the test anode and the test cathode, the test cathode connected to a gate of a sensing transistor provided in the pixel.

5. The light emitting display apparatus of claim 4, wherein the sensing transistor comprises:

a first terminal of the sensing transistor that is connected to an anode of the light emitting device and the test anode of the test light emitting device, a second terminal of the sensing transistor that is connected to a sensing line, and wherein the gate of the sensing transistor is connected to a sensing control line and the test cathode.

6. The light emitting display apparatus of claim 4, further comprising:

a connection line that connects the test anode of the test light emitting device and the anode of the light emitting device, the connection line on a layer that is different from the test anode and the anode.

7. The light emitting display apparatus of claim 1, further comprising:

an outer anode that surrounds the test light emitting device in a plan view of the light emitting display apparatus, wherein an anode of the light emitting device is spaced apart from a test anode included in the test light emitting device with the outer anode between the anode and the test anode.

8. The light emitting display apparatus of claim 7, further comprising:

a connection line that connects the anode and the test anode.

9. The light emitting display apparatus of claim 8, wherein the anode is connected to a first side of the connection line through a first contact hole, and the test anode is connected to a second side of the connection line through a second contact hole.

10. The light emitting display apparatus of claim 7, wherein the outer anode is in the transmission area but not the light emitting area.

11. The light emitting display apparatus of claim 7, wherein the light emitting device includes a light emitting layer and a cathode that extend from the light emitting area onto the outer anode.

12. The light emitting display apparatus of claim 11, wherein the test light emitting device further comprises:

a test anode; and a test cathode on the test anode, wherein a portion of the cathode is on the outer anode is disconnected from the test cathode.

13. The light emitting display apparatus of claim 1, wherein the test light emitting device further comprises:

a test cathode that is disconnected from a cathode of the light emitting device.

14. The light emitting display apparatus of claim 13, further comprising:

a sensing control line that is connected to the test cathode; and a sensing transistor included in the pixel, the sensing transistor including a gate electrode that is connected to the sensing control line, a first terminal of the sensing transistor that is connected to an anode of the light emitting device, and a second terminal of the sensing transistor that is connected to a sensing line.

15. The light emitting display apparatus of claim 13, further comprising:

an undercut between the test light emitting device and the light emitting device in a plan view of the light emitting display apparatus, the undercut disconnecting the test cathode and the cathode from each other.

16. The light emitting display apparatus of claim 1, wherein the light emitting device comprises an anode and the test light emitting device comprises a test anode that is connected to the anode of the light emitting device.

17. A light emitting display apparatus comprising:

a substrate including a light emitting area configured to display an image and a transmission area that is more transmissive of external light than the light emitting area;

a light emitting device in the light emitting area, the light emitting device including an anode electrode, a light emitting layer on the anode electrode, and a cathode electrode on the light emitting layer;

a test light emitting device in the transmission area, the test light emitting device including a test anode electrode that is electrically connected to the anode electrode of the light emitting device, a test light emitting layer on the test anode electrode, and a test cathode electrode on the test light emitting layer; and a boundary hole around the test light emitting device, the boundary hole disconnecting the cathode electrode of the light emitting device and the test cathode electrode from each other, wherein a signal which is supplied to a test cathode electrode of the test light emitting device is different from a signal which is supplied to a cathode electrode of the light emitting device.

18. The light emitting display apparatus of claim 17, further comprising:

a connection line including a first end that is connected to the anode electrode and a second end that is connected to the test anode electrode.

19. The light emitting display apparatus of claim 18, further comprising:

a planarization layer on the connection line in the transmission area; and a contact hole through the planarization layer and overlapping the second end of the connection line, wherein the test anode electrode is connected to the second end of the connection line via the contact hole.

20. The light emitting display apparatus of claim 19, wherein a portion of the test light emitting layer and a portion of the test cathode electrode are within the contact hole.

21. The light emitting display apparatus of claim 17, further comprising:

a sensing transistor including a gate electrode; and a sensing control line that is connected to the test cathode electrode and the gate electrode of the sensing transistor.

22. The light emitting display apparatus of claim 21, wherein a portion of the sensing control line is overlapped by a portion of the boundary hole, and a portion of the test cathode electrode is directly connected to the portion of the sensing control line in the portion of the boundary hole.

23. The light emitting display apparatus of claim 17, wherein the boundary hole includes an undercut structure having an upper surface that extends past a lower surface of the undercut structure and an angled end between an end of the upper surface and an end of the lower surface, the undercut structure disconnecting the cathode electrode and the test cathode electrode from each other.

24. The light emitting display apparatus of claim 17, further comprising:

an outer anode that surrounds the boundary hole, the outer anode disconnected from the anode electrode and the test anode electrode.

25. The light emitting display apparatus of claim 17, where the test light emitting device is smaller than the light emitting device.

26. The light emitting display apparatus of claim 17, wherein the test light emitting device is configured to be turned on to emit light to determine a cause of the light emitting device being defective.

* * * * *